Dec. 1, 1936. J. OCHSNER 2,062,924
VEHICLE FOR COLLECTING AND TRANSPORTING REFUSE
Filed Nov. 21, 1935 2 Sheets-Sheet 1

Inventor
Jacob Ochsner
By
B. Linger, atty.

Dec. 1, 1936.   J. OCHSNER   2,062,924
VEHICLE FOR COLLECTING AND TRANSPORTING REFUSE
Filed Nov. 21, 1935   2 Sheets-Sheet 2

Inventor
Jacob Ochsner
By Bilinger, atty.

Patented Dec. 1, 1936

2,062,924

UNITED STATES PATENT OFFICE 2,062,924

VEHICLE FOR COLLECTING AND TRANSPORTING REFUSE

Jacob Ochsner, Zurich, Switzerland

Application November 21, 1935, Serial No. 50,967
In Switzerland March 11, 1935

2 Claims. (Cl. 214—67)

The present invention relates to a vehicle for collecting and transporting refuse and more particularly to vehicles characterized by a body hinged at its back upon a chassis so as to be capable of tilting upwards to discharge its load.

The main object of the invention consists in the provision of an improved rear section of the body and of improved means to automatically open the body at the rear as the same is tilted to allow the discharge.

A further object of the invention is to provide a pivotal rear section pivoting as the body is tilted said rear section carrying means to load the body to its maximum capacity.

A still further object consists in the provision of a power operated mechanism to press refuse dumped into hoppers arranged at the pivotal rear-section into the main body or storage tank.

An object of the invention, accordingly, is to provide a vehicle of the above character, the same being constructed in such manner that substance to be loaded therein need only be lifted to a moderate height, the capacity of the vehicle nevertheless being preserved at a maximum.

A still further object of this invention is the construction of a device of the class mentioned which is of simple, durable construction, dependable in use and efficient in action and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
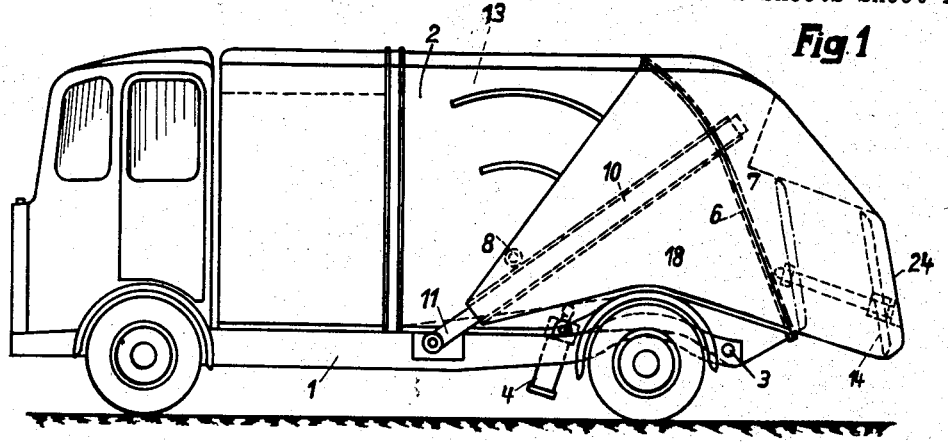
Fig. 1 is a side-elevation of the vehicle.
Figure 2:
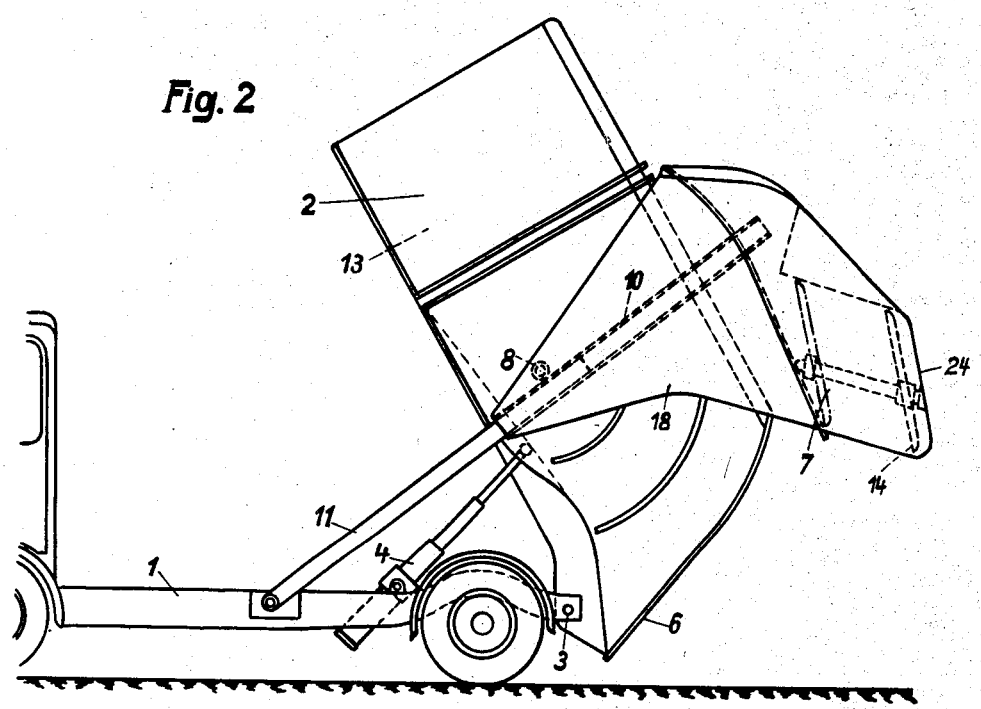
Fig. 2 is a similar view of the hind part of the vehicle showing the body in dumping position.
Figure 3:
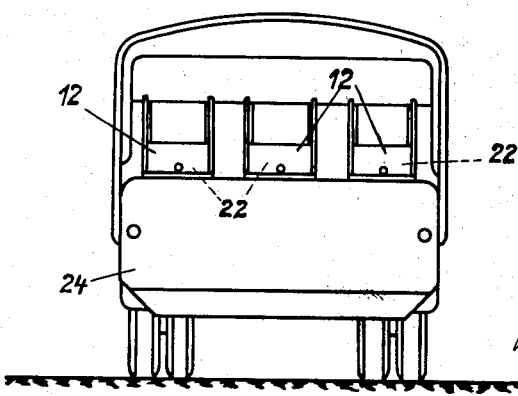
Fig. 3 is a back view of the vehicle.

Referring to the drawings, it will be apparent on reference to Fig. 1 that there is shown an automobile truck on which a body 2 embodying the features of the invention is mounted. The truck comprises a chassis 1 of standard construction except for slight additions hereinafter stated specifically. The body 2 is pivotally mounted at 3 upon the back of the chassis so as to be capable of tilting upwards. The body 2 is closed on the top and the back is formed with an inclined curved back side 6 with a full opening normally closed by a rear section 7 forming a cover. The body 2 may be tilted by a hydraulic device 4 of any known construction into an inclined position sufficiently high to ensure a complete discharge of the content of the body 2. On each side beam of the chassis 1 a strong bar 11 is pivotally mounted. Each bar 11 engages slidingly a guide 10 firmly attached to one of two side walls 18 of the rear section embracing the body 2. By raising the body 2 the rear section 7 slides on the two bars 11, swinging away from the back of the body, the rear section being pivoted to the body at 8. After fully tilting the body by the hydraulic device 4 the rear section 7 assumes the position as shown in Fig. 2, the back side of the body being fully open.

The rear section has filling openings arranged side by side into which dust-bins may be dumped. The filling openings are located rather low, the dustbins or containers need only be lifted to a relatively low height. The filling-in openings 22 are closed by lids 12. The rear section has within itself a ram plate 14 which is slidably arranged. Each ram plate 14 conveys the refuse dumped into said rear section into the body.

Figure 4:
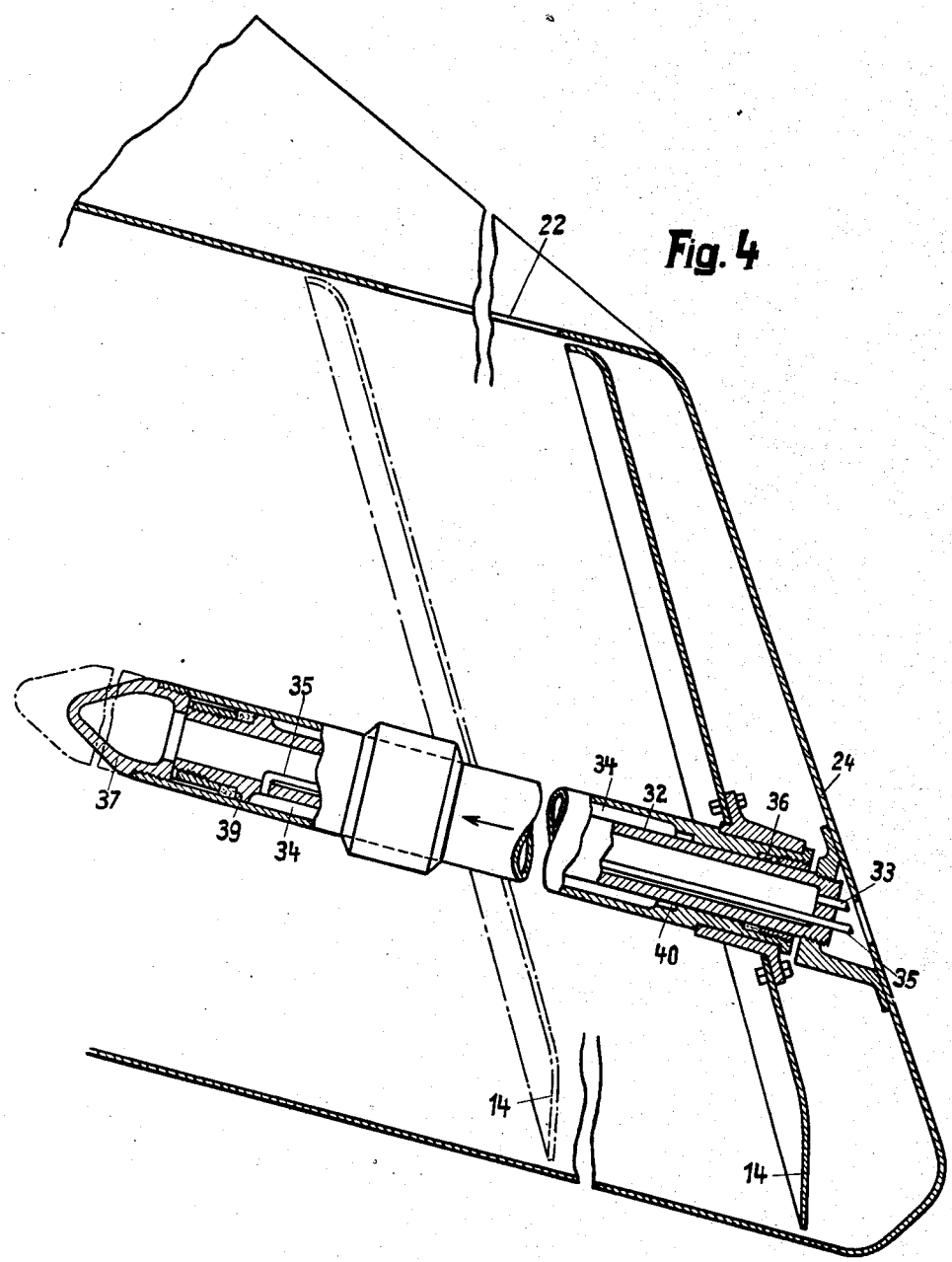
Fig. 4 shows a hydraulic device to operate the ram pushing the refuse into the tank.

Any practical means may be provided to operate the said ram plates for instance a hydraulic piston operated by the motor of the truck and controlled by the driver. A preferred mode of construction is shown in Fig. 4 in sectional elevation.

On a fixed wall for instance the back wall 24 a hollow cylinder 32 is rigidly fixed. On the cylinder 32 a hollow piston 37 is slidably mounted, the ram or piston plate 14 being fastened to said piston. The piston 37 is closed and the cylinder 32 is open at the face end. Between the wall of the hollow piston 37 and the mantle of the cylinder 32 a chamber 34 is formed. The chamber 34 is connected by a pipe 35 to a pump etc. delivering liquid under pressure and the hollow of the cylinder 32 is connected by a pipe 33 to the same pump not shown in the drawing. Valves or the like may be arranged to control the flow of the liquid. Packings 36, 39 are provided to prevent leakage. If liquid under pressure enters the hollow cylinder 32, the piston 37 and therewith the plate 14 is pressed forward into the position shown by broken lines (Fig. 4). The refuse is thereby fed into the chamber 13. While the piston advances the pipe 35 is kept open. By opening pipe 33 and by pressing liquid through pipe 35 into the space 34 the piston is returned to its initial position. The bars 11 may be done away with and the rear section may be hinged at the top of the body. The bottom of the body may be a travelling band (not shown), which driven by a motor or by some suitable gear may be used to discharge the body without tilting it. Some suitable power driven device may be used to raise the rear section.

In this application I make no claim per se to the ram device for pushing the material into the tank as that constitutes a part of the subject matter of my co-pending application, Ser. No. 48,044, filed November 2, 1935.

What I wish to secure by U. S. Letters Patent is:—

1. A vehicle for collecting and transporting refuse, comprising a chassis, a body hinged at its back end upon said chassis and having a discharge opening at the back, means for raising said body to an inclined position, a rear section closing the discharge opening, means pivoting said rear section to the front section of said body on a transverse axis located between the back hinge of the body and the front of the body, means to lift the rear section bodily upward as the front section of the body is tilted, to clear the rear end of the front section of the body, at least one chamber at the lower end of the said section, an opening in said chamber adapted to receive the refuse, an inclined passage and a ram plate to convey the refuse into said body.

2. A vehicle for collecting and transporting refuse, comprising a chassis, a body hinged at its back end upon said chassis and having a discharge opening at the back, means for raising said body to an inclined position, a rear section closing the discharge opening, movably arranged on said body, means to lift the rear section, at least one chamber at the lower end of the said section, an opening in said chamber adapted to receive the refuse, an inclined passage and a ram plate to convey the refuse into said body, guides secured to the sides of said rear section, bars pivoted to the vehicle and slidably engaging said guides, said rear section being pivoted adjacent said guides to the body, in virtue of which pivot, guides and bars when the body is tilted up on its hinge said rear end will be raised and vice versa.

JACOB OCHSNER.